US012512696B2

(12) United States Patent
Mohan

(10) Patent No.: US 12,512,696 B2
(45) Date of Patent: Dec. 30, 2025

(54) POWER SWITCHING VIA ARC SCHEMATIC

(71) Applicant: GE DIGITAL HOLDINGS LLC, San Ramon, CA (US)

(72) Inventor: Vinoth Mohan, Lynnwood, WA (US)

(73) Assignee: GE DIGITAL HOLDINGS LLC, San Ramon, CA (US)

( * ) Notice: Subject to any disclaimer, the term of this patent is extended or adjusted under 35 U.S.C. 154(b) by 909 days.

(21) Appl. No.: 17/578,991

(22) Filed: Jan. 19, 2022

(65) Prior Publication Data

US 2022/0329099 A1    Oct. 13, 2022

Related U.S. Application Data

(60) Provisional application No. 63/172,116, filed on Apr. 8, 2021.

(51) Int. Cl.
| | |
|---|---|
| *H02J 13/00* | (2006.01) |
| *G05B 15/02* | (2006.01) |
| *G06F 3/0484* | (2022.01) |
| *G06T 11/20* | (2006.01) |
| *H02J 3/38* | (2006.01) |

(52) U.S. Cl.
CPC ........ *H02J 13/00001* (2020.01); *G05B 15/02* (2013.01); *G06F 3/0484* (2013.01); *G06T 11/206* (2013.01); *H02J 3/381* (2013.01); *G06T 2200/24* (2013.01); *H02J 2300/22* (2020.01); *H02J 2300/28* (2020.01)

(58) Field of Classification Search
None
See application file for complete search history.

(56) References Cited

U.S. PATENT DOCUMENTS

| | | | |
|---|---|---|---|
| 2017/0092055 A1* | 3/2017 | Brockman | ........... G06V 20/176 |
| 2021/0389356 A1* | 12/2021 | Reiman | ............ H02J 13/00002 |
| 2022/0308573 A1* | 9/2022 | Ranganathan Sathyanarayana .... G05B 23/0283 |

FOREIGN PATENT DOCUMENTS

| | | | |
|---|---|---|---|
| CN | 106355510 A | * | 1/2017 |
| KR | 20160033975 A | * | 9/2014 |
| KR | 101986891 B1 | * | 7/2017 |

\* cited by examiner

*Primary Examiner* — Thomas C Lee
*Assistant Examiner* — Anzuman Sharmin
(74) *Attorney, Agent, or Firm* — Buckley, Maschoff & Talwalkar LLC

(57) ABSTRACT

Provided is a system and method for visualizing power components on a power grid via an arc diagram. The arc diagram can be an interactive diagram that enables an operator to perform a switching operation via the arc diagram. In one example, the method may include storing power measurements from a power grid and geographical topology data of devices on the power grid via a memory device, generating and displaying an arc diagram based on the geographical topology data, where the arc diagram comprises a plurality of nodes corresponding to a plurality of devices on the power grid which are arranged along a horizontal axis in the arc diagram, and arranging arc-shaped structures between the plurality of nodes on the horizontal axis based on the power measurements, where the arc-shaped structures represent power flows between the plurality of devices.

18 Claims, 10 Drawing Sheets

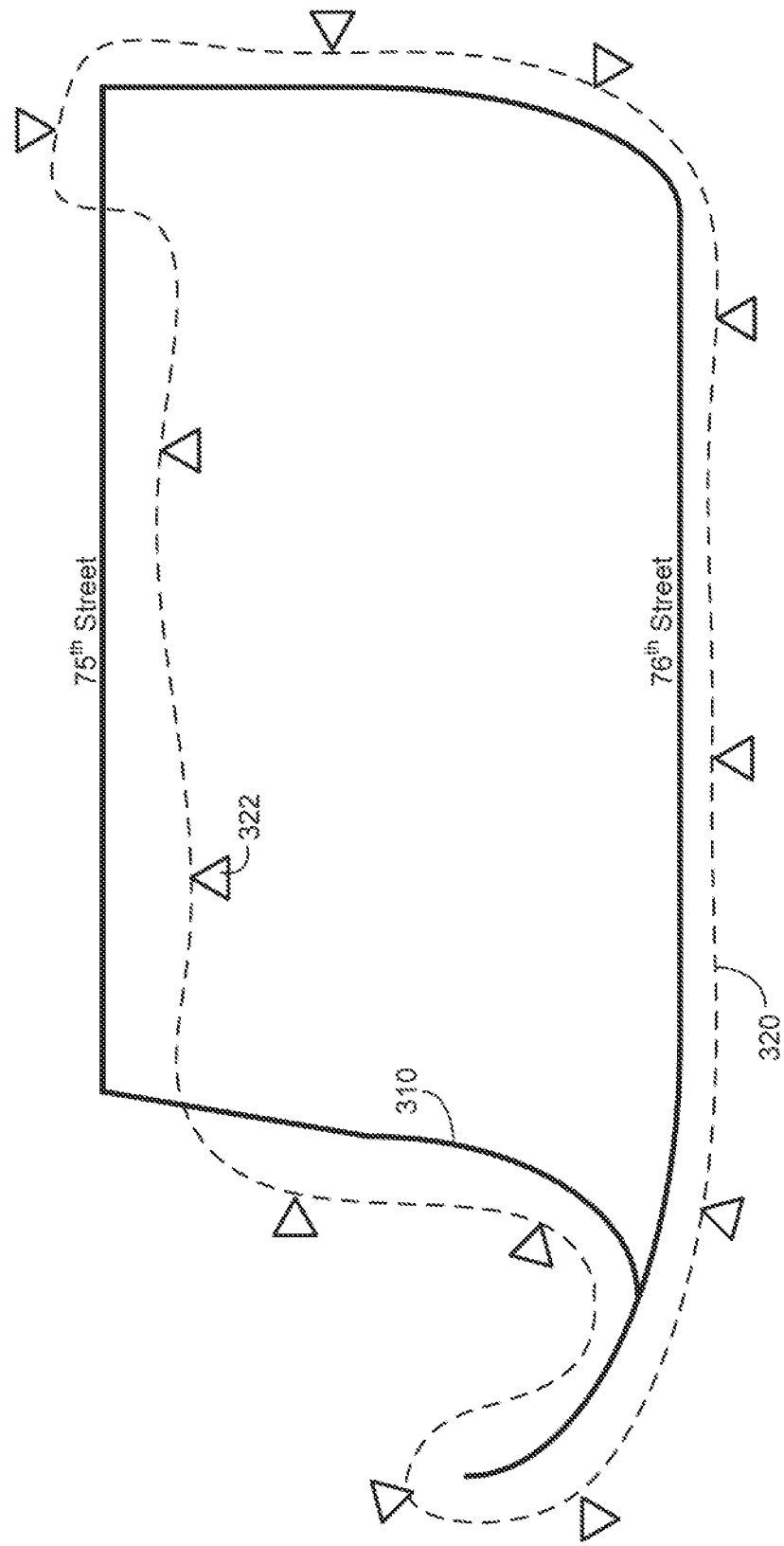

(Orthogonal View)

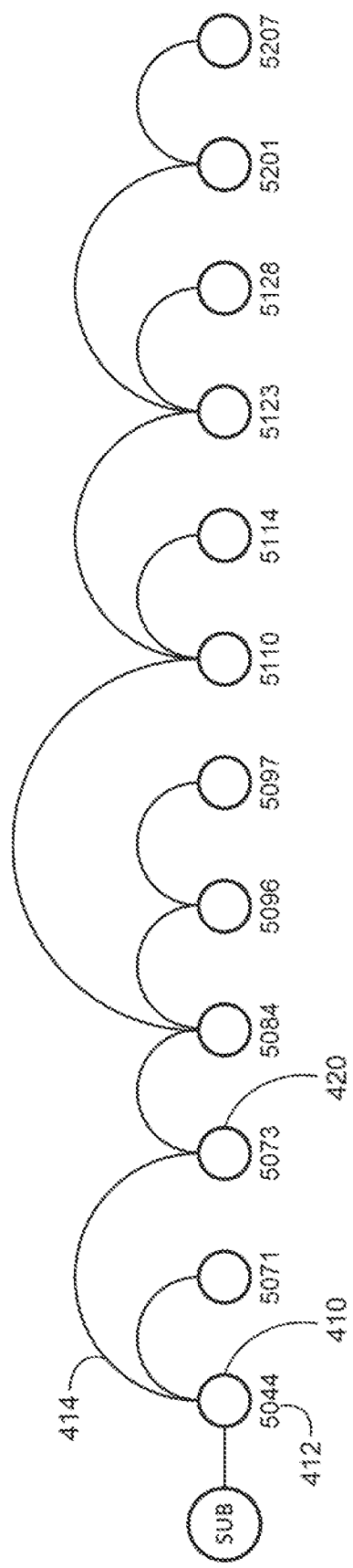
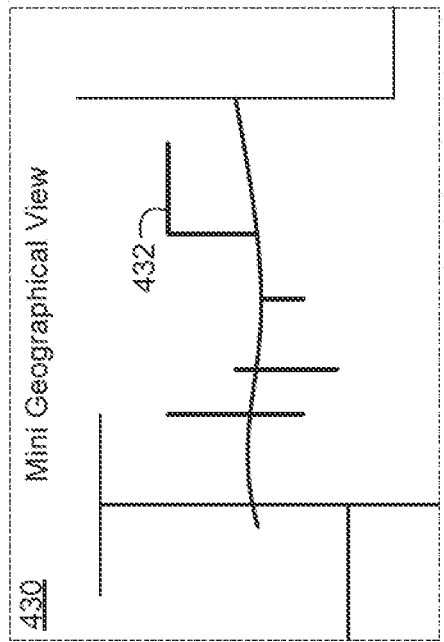
FIG. 4A

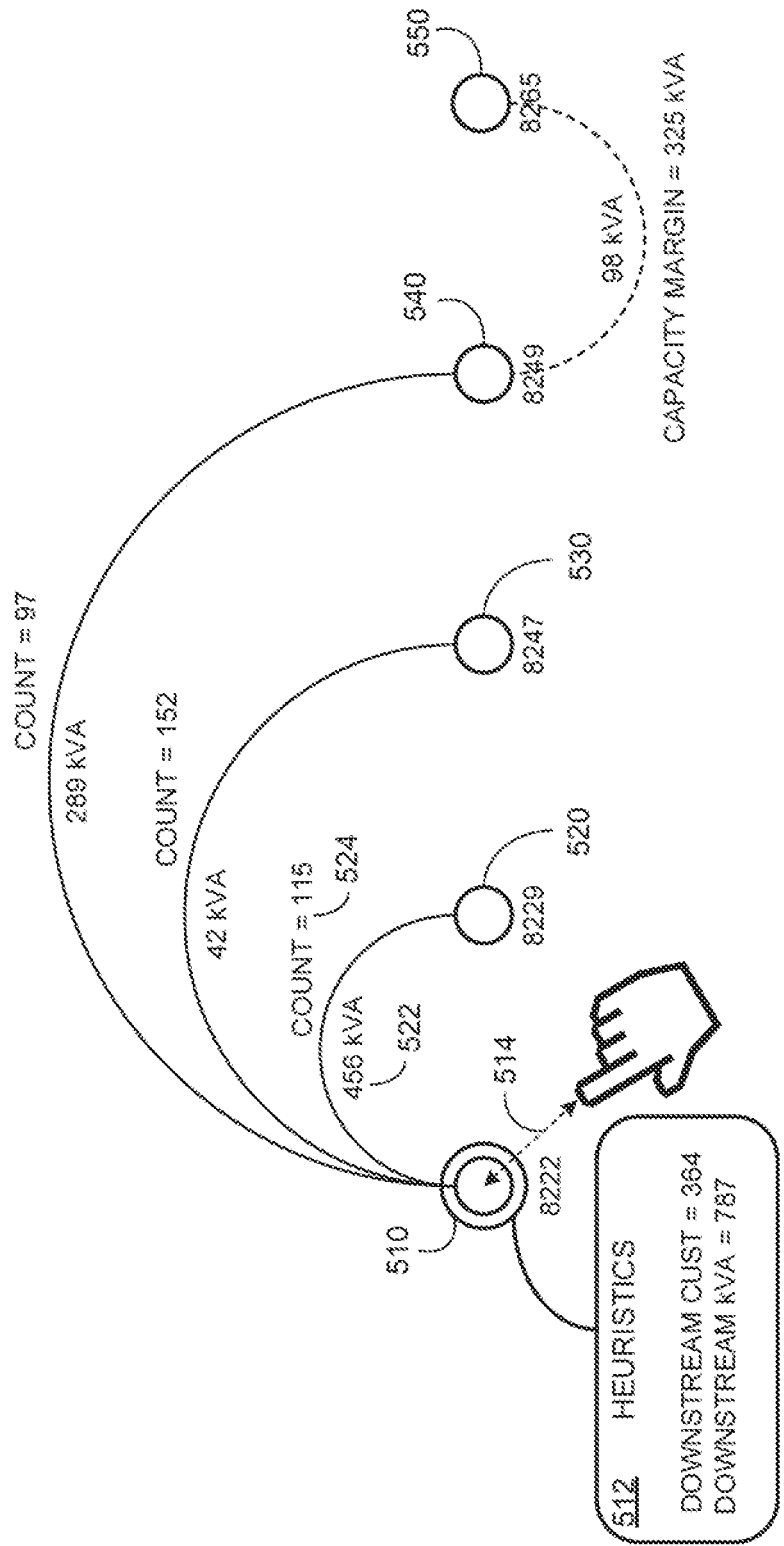

POWER SWITCHING VIA ARC SCHEMATIC

CROSS-REFERENCE TO RELATED APPLICATIONS

This application claims the benefit of U.S. Provisional Patent Application No. 63/172,116, filed on Apr. 8, 2021, in the United States Patent and Trademark Office, the entire disclosure of which is hereby incorporated by reference for all purposes.

BACKGROUND

Advanced Distribution Management System (ADMS) is a software platform that supports distribution management and optimization of a power grid. An ADMS platform can receive real-time data from the power grid including from a SCADA system, sensor devices and smart meters. The ADMS platform normally outputs and displays a user interface that shows the network topology and various customer data. The user interface may enable the user to zoom in, zoom out, scan in different directions, etc. to view various geographical locations of the power grid as well as the devices and customers at such geographical locations. Furthermore, an operator can input commands via the user interface to thereby control parts of the grid during an outage or as part of a planned switching operation. For example, an operator can input commands on the user interface to turn off devices, turn on devices, move taps, and the like.

Traditionally, the ADMS platform provides multiple options for viewing the power grid. For example, a first option is the "street-view" in which a map of the street is provided along with power device locations (e.g., switches, sub-stations, lines etc.) and customer locations (homes, buildings, offices, etc.) A second option may be referred to as an "orthogonal schematic view" in which the geographic network is converted into a circuit diagram.

However, both options for viewing the power grid make it difficult on the operator during switching scenarios. For example, both the street-view and the orthogonal view become crowded and almost unreadable in heavily powered areas such as shopping malls, town centers, downtowns, etc. Another problem occurs when an operator zooms in on the graph. In this situation, the operator often loses track of where they are in relationship to the rest of the map. Thus, an operator can become confused. The result is that oftentimes, operators may incorrectly switch on/off the wrong power device.

SUMMARY

The example embodiments are directed to a user interface for an ADMS platform which converts the power grid into an arc schematic (diagram) rather than a traditional street view or a traditional orthogonal view. The arc schematic diagram may include nodes arranged in a horizontal line where each node represents a different power device on the power grid.

Furthermore, arcs may be generated and displayed between the nodes in the arc schematic. The arcs can be used to represent interconnecting lines between the power devices. For example, arcs on the upper half of the horizontal line can represent lines with power flows in a predefined direction (e.g., from left to right, etc.) while arcs on the lower half of the horizontal line can represent power flows in an opposite direction, or vice versa. Furthermore, the nodes can be spaced apart (e.g., equidistant, etc.) and individually labeled such that each power device is clearly understandable to a viewer. In addition, the example embodiments may also provide heuristics on the arc diagram. The heuristics may provide additional metadata of the power grid including number of power customers, voltage, etc., between two devices on the power grid.

The arc diagram makes it easier for an operator to visualize the different components of the power grid while performing switching operations such that an incorrect switching operation can be prevented. Furthermore, the arc diagram provides additional heuristics between power devices on the power grid within the arc diagram. Such heuristics are not found in traditional ADMS views.

In an aspect of an example embodiment, provided is a computing system that may include a memory configured to store power measurements from a power grid and geographical topology data of devices on the power grid, and a processor configured to one or more of generate and display an arc diagram based on the geographical topology data, where the arc diagram comprises a plurality of nodes corresponding to a plurality of devices on the power grid which are arranged along a horizontal axis in the arc diagram, and arrange arc-shaped structures between the plurality of nodes on the horizontal axis based on the power measurements, where the arc-shaped structures represent power flows between the plurality of devices.

In an aspect of an example embodiment, provided is a method that may include storing power measurements from a power grid and geographical topology data of devices on the power grid via a memory device, generating and displaying an arc diagram based on the geographical topology data, where the arc diagram comprises a plurality of nodes corresponding to a plurality of devices on the power grid which are arranged along a horizontal axis in the arc diagram, and arranging arc-shaped structures between the plurality of nodes on the horizontal axis based on the power measurements, where the arc-shaped structures represent power flows between the plurality of devices.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating a user interface for use in power switching operations which includes a geographical view of power devices.

FIGS. 4A and 4B are diagrams illustrating a user interface that includes an arc schematic view of power devices in accordance with example embodiments.

FIGS. 5A and 5B are diagrams illustrating heuristics displayed within a user interface including an arc schematic view of power devices in accordance with an example embodiment.

Figure 1:
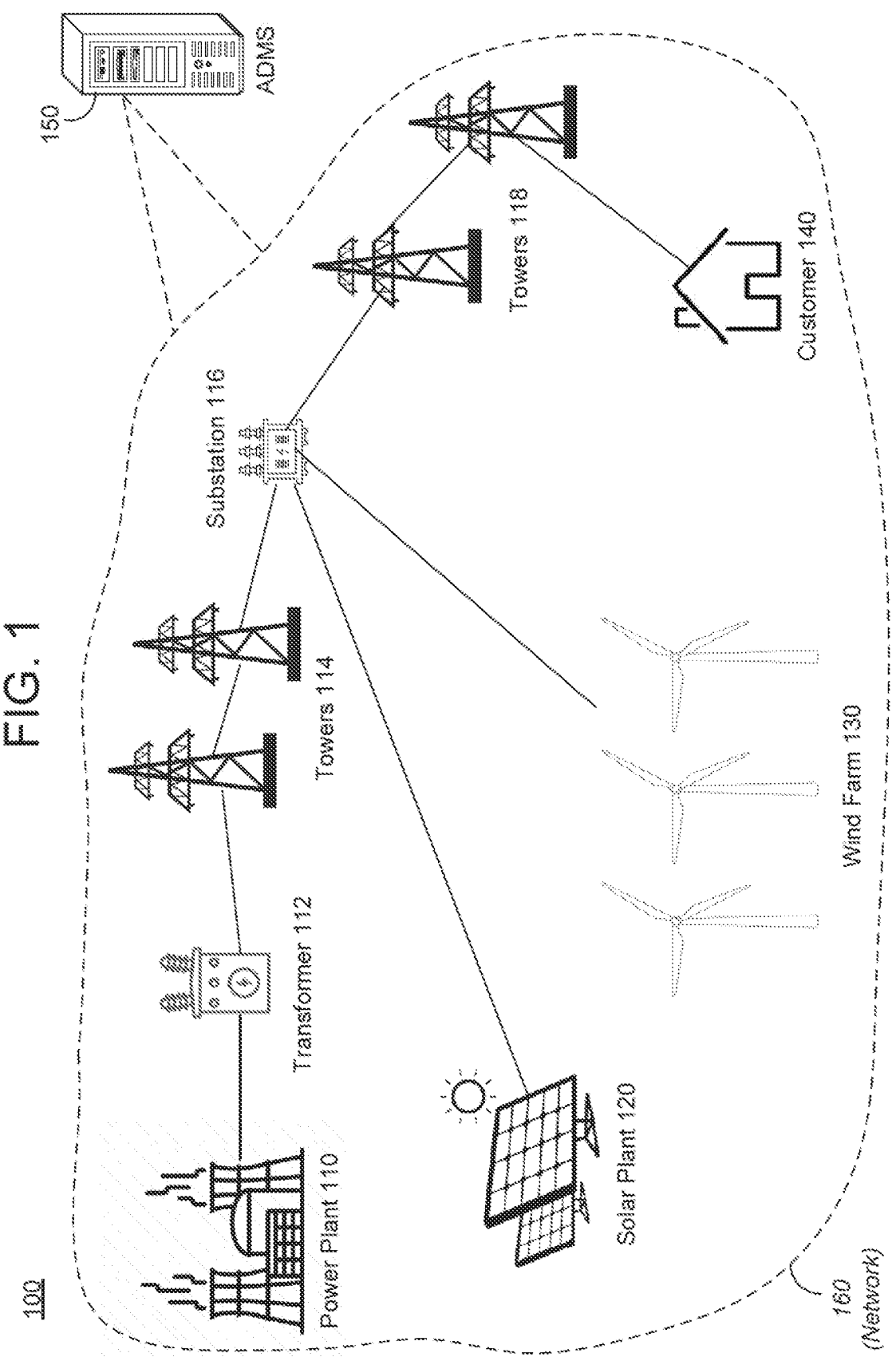
FIG. 1 is a diagram illustrating a power system for delivering electricity to a customer in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to not obscure the description with unnecessary detail. Thus, the present disclosure is not intended to be limited to the embodiments shown but is to be accorded the widest scope consistent with the principles and features disclosed herein.

Advanced Distribution Management Systems (ADMS) is a software application (or applications) for distribution management and optimization of an electrical power grid (or electrical network). An ADMS includes functions that automate outage restoration and optimize the performance of the power grid. ADMS functions for electric utilities include fault location, isolation and restoration, volt/volt-ampere reactive optimization, conservation through voltage reduction, peak demand management, and support for microgrids and electric vehicles. The ADMS is often hosted by a server such as a web server, a cloud platform, an on-premises server, and the like, which is in communication with the power devices on the electrical network.

ADMS may be inclusive of SCADA, OMS, and DMS in the electrical network. ADMS may have the functionality of DMS and OMS applications and utilize the real-time data acquisition capabilities of SCADA to accentuate each system's capabilities. The data is then visually represented and managed by an operator from a single, intuitive user interface. The operator is often responsible for managing distributed power resources, decreasing outage times, reducing feeder burden, and improving circuit performance and efficiency all at once. As a result, an operator needs a user interface that provides a clear view of the connections and the underlying data measured of the power devices and customers on the electric network.

Switching operations can performed by the operator on digitally displayed models of the power grid included within the user interface. The models may include geo-spatial renderings of the of the power devices on the electrical network and the surrounding customers. However, geographical renderings become much more difficult for geographical locations where there are more consumers on the grid. For example, in dense areas such as town centers, downtowns, shopping malls, and the like, visualizing the components and the connections among the components within the geo-spatial network becomes tricky due to an overwhelming number of components with respect to screen space.

In many cases, operators prefer to perform switching operations on a schematic view of the electrical network instead of the geographic/street level view of the electrical network. The schematic views often provide orthogonal schematic renderings of the feeders of the power grid. The schematic views reduce the nodes/lines and keep only the most important devices on the ortho-schematic layouts.

The underlying issue that makes both the geographic view and the orthogonal schematic view complex is the need to have network-level awareness. When too many devices and inter-connecting links are rendered on the screen, a hairball effect happens reducing the readability of the electrical network. On top of this, human operators need to consider micro and macro-level operational parameters for every switching action being performed in the geographic or orthogonal schematic views. The operational parameters include customers that could be impacted, criticality of the customers, potentially hazardous conditions, safety of crew, power capacity of the network, reliability of the network, possible power supply sources, loops, parallels, isolation points, flow violations etc.

The example embodiments are directed to a visual rendering of an electrical network using an arc schematic view. Within the arc schematic, each device may be represented by a node (e.g., circle, ellipse, triangle, rectangle, square, other shaped object, etc.) and arcs (e.g., semi-circles, partial circles, partial ovals, etc.) may be rendered in a manner that interconnects the nodes (of the devices) based on a flow of power between the devices. In some cases, the arcs on the top half (i.e., above the nodes) of the schematic view may represent power that flows from left to right, while arcs on the bottom half of the schematic view (i.e., below the nodes) may represent power that flows in the opposite direction. The arc schematic described herein may be integrated within a software application such as ADMS, and the like, and used by an operator during power switching operations.

In addition to using an arc schematic, the user interface may include heuristics associated with the devices and the consumers within the electrical network. For example, each node may be labeled with a unique ID of the device being represented. Furthermore, text-based descriptions may be provided in between the nodes (e.g., next to the arcs) which provide information about the number of consumers, the power measurements, and the like, between the devices on the power grid.

The arc schematic may be a one-dimensional layout in which the nodes representing the power device are arranged in one single horizontal line. This can be achieved using arc schematics (based on an arc diagram layout). The nodes may be spaced apart by an equidistant amount of space within the arc schematic regardless of the geographical distance between the corresponding power devices in the electrical network. For example, two power devices that are 1 mile apart in the geographical network and two power devices that are 5 miles apart in the geographical network can be represented using the same distance in the arc schematic. In addition, the arc schematic can provide heuristic that are relevant for switching options for every switching device. This can be achieved by providing switch-level situational awareness and simple recommended switching options for each device.

The arc schematic enables the nodes (devices) to be arranged along a straight and horizontal line and the edges (lines) that interconnect the nodes are drawn as arcs between the nodes. Here, the presence of arcs above and below the axis that create loops represents power loops in the electrical network. Some of the benefits of the arc schematic include visualization of clusters (densely connected devices) easily without cluttering up the display. Furthermore, as the user traverses across the nodes, context-based information can be shown to facilitate switching decisions.

When an operator tries to perform switching through the arc schematic, information about the power devices and the connections between them may be presented to the operator. As an example, the user interface may display a number of customers and/or kVA that will be dropped due to opening of a device, alternate paths that are available to pick up dropped customers if needed total extra capacity that the alternate paths can safely carry without violating the limits, presence of any critical customers on the path, potentially hazardous conditions, safety data for the crew, isolation points, faulted conditions, and the like. Such additional data gives the operator a fuller understanding of the current conditions of the electrical network when inputting switching operations.

Provided is a system and method which renders an arc schematic representing an electrical network via a user interface such as a user interface within a page of an ADMS system/application. The arc schematic enables an operator to clearly identify different devices on the electrical network regardless of their geographical location and more easily understand the current conditions of the electrical network in comparison to traditional user interfaces. The arc schematic representation may also be embedded with heuristics thereby providing an easy understanding of how switching operations will affect neighboring nodes even when the operator has zoomed in on a particular area or subset within the power grid.

In the example embodiments, the arc diagram facilitates easier switching operations. Furthermore, the example embodiments provide a new auto-ordering visual layout that eliminates clutter. The layout may only show the relevant portion (devices and lines) of the network that will be impacted by a particular switching operation. Furthermore, heuristics embedded on the arc schematic layout may facilitate switching on auto-pilot. Operators will always know the current condition of the network and the future condition of the network due to any switching that they may perform.

FIG. 1 illustrates a power delivery system 100 showing components that can facilitate the generation of power and the process of delivering power (e.g., delivering energy, electricity) to customer premises 140. Electric power can be generated at a power generation facility (power plant 110), passed to a transformer 112 and then carried by transmission power lines 114 to substations 116 having transformers. A local distribution system of smaller, lower-voltage transmission lines 118 and substations carry power to the customer premises 140. In the example of FIG. 1, the power delivery system 100 may also include renewable sources of power including a solar plant 120 and a wind farm 130. As in the case of the power plant 110, the solar plant 120 and the wind farm 130 can generate electric power which is passed to a point on the grid (e.g., substation 116, etc.) and carried to the customer premise 140 just as the power from the power plant 110.

In the example embodiments, a variety of facilities can generate electric power including both power plants and renewable energy sources. For example, power generation facilities (e.g., power plant 110, etc.) can include power plants that burn coal, oil, or natural gas. As another example, power generation facilities can include nuclear power plants, renewable sources of energy (e.g., solar plant 120, wind farm 130, etc.) such as hydroelectric dams, wind turbines, and solar panels, and the like. The location of these power generation facilities, and their distance from end users, can vary widely.

The electricity that is generated by the power generation facilities may be stepped up or stepped down by transformers (e.g., transformer 112) which may be located at power plant substations adjacent to (and connected via power lines to) the power plant. For example, a transformer may be a step-up transformer that will "step up" the voltage of the electricity. When power travels through power lines (e.g., metallic wires that conduct electricity), some of that power is wasted in the form of heat. The power loss is proportional to the amount of current being carried. Power companies keep the current low and compensate by stepping up the voltage. After the voltage is stepped up, the electricity is typically carried over long distances by high voltage power transmission lines, typically supported and elevated by transmission towers (e.g., transmission towers 114 and 118) that can be of various dimensions, materials, and heights.

In some embodiments, the voltage may be gradually reduced by step-down transformers as the electricity approaches customer premises. Transmission substations contain step-down transformers that reduce the voltage of the electricity. The electricity can then be distributed on lower-voltage power lines. A typical transmission substation can serve tens of thousands of customers. The electricity leaving transmission substations can travel through power lines to distribution substations. Distribution substations contain step-down transformers that further reduce the voltage of electricity and distribute the power to cities and towns through main power lines, which can serve hundreds of customers. Distribution lines carry lower voltage power to clusters of homes and businesses, and are typically supported by wooden poles. Of note, power lines can also be buried under the ground. Of note, substations can contain a variety of other equipment, including switches, breakers, regulators, batteries, etc.

The voltage from a branch line can further be reduced by transformers that are mounted on poles that connect customer premises through a service drop power line. Customer premises (e.g., customer premise 140, etc.) can be of any type and variety. Customer premises can be a residential customer premises, such as residential houses. Customer premises can be an industrial customer premises, such as factories. Customer premises can be commercial customer premises, such as an office building. If a particular customer premises has a heavier load (e.g., has a higher demand for power), then a larger transformer, instead of a pole transformer, might service that particular customer premises.

In the example of FIG. 1, the power delivery system 100 is an example of an electrical network or power grid. The system 100 may also include network connectivity enabling the different components within the power delivery system 100 to communicate with each other and with a remote device such as a server, or the like, which is hosting an ADMS system 150. Here, a network 160 may include wireless and/or wired network connections that implement a WLAN, WiMAX, or other network. The ADMS system 150 may include one or more applications for visualizing the current conditions of the electrical network and enabling an operator to input commands/operations for switching power on/off, and the like. Here, data from the different components may be transmitted to the ADMS system 150 via the network 160.

Figure 2:
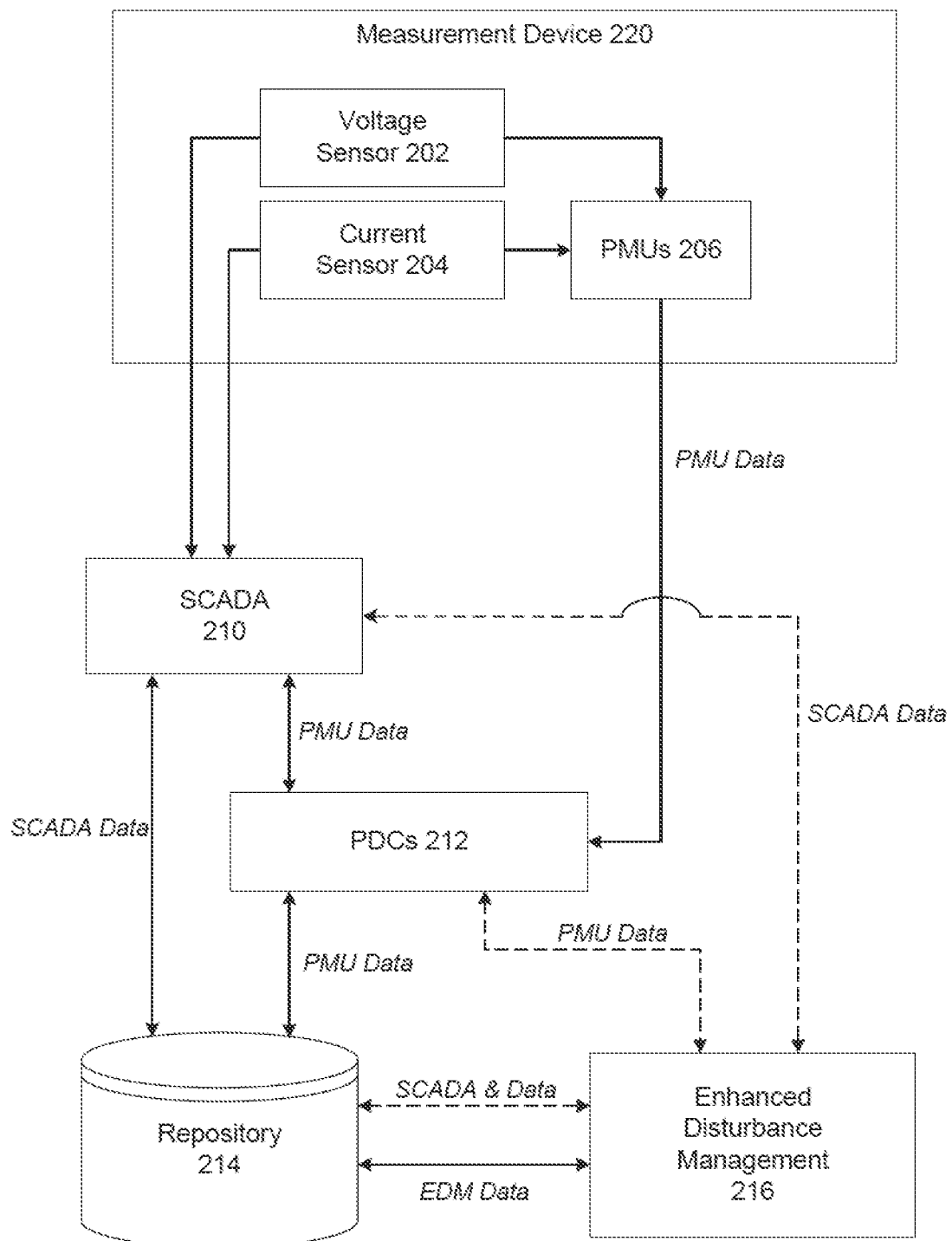
FIG. 2 is a diagram illustrating a network topology of an electrical grid.

FIG. 2 illustrates a measurement system 200 for measuring data from an electrical network in accordance with an example embodiment. For example, the ADMS system described herein may receive data from any of the components shown in the example of FIG. 2. In some embodiments, the ADMS system described herein may be integrated within one of the devices shown in FIG. 2, for example, a server or other computing system that hosts a Supervisory Control and Data Acquisition (SCADA) module 210 and/or an Enhanced Disturbance Management (EDM) module 216 that is operable to read (e.g., obtain) monitoring data, for example, from the SCADA module 210. As another example, the ADMS system described herein may be installed on another device that is network-connected to the SCADA module 210 and/or the EDM module 216.

Referring to FIG. 2, a measurement device 220 may include sensors 202, 204, etc., that measure a range of parameters such as magnitude and phase angle of voltage, current, harmonic distortion, real and reactive power, power factor, and fault current. Examples of some sensors include, but are not limited to, voltage and current sensors, PMUs, transformer-Metal Insulated Semiconducting (MIS) gas in oil sensors, circuit breaker sulfur hexafluoride density sensors, conductor temperature and current sensors that record overhead transmission conductor temperatures and current magnitudes, overhead insulator leakage current sensors, Transmission Line Surge Arrester (TLSA) sensors, and the like.

In the example of FIG. 2, the system 200 may include multiple measurement devices 220 located in various parts (e.g., such as nodes) throughout the grid. The measurement devices 220 can be coupled via a network of transmission lines, as well as through wireless and wired communications mediums (e.g., cellular, ethernet, etc.) to an ADMS server.

In example embodiments, the current conditions (e.g., topology, customer data, power flow data, etc.) on the power grid via an arc schematic can be facilitated through the use and analysis of the data received from measurement devices 220 and monitoring of system conditions that are then communicated to a central control center or other host system of the ADMS, where a combination of automated actions and human decision assist in striving to ensure that the power grid is stable and balanced, and switching operations are performed when necessary. For example, the measurement device 220 may include a phasor measurement unit (PMU) 206 which can capture data of a disturbance event. PMUs 206 typically have a naming convention based on PMU information which is defined by a regional transmission authority.

In addition to obtaining data from the SCADA module 210, the EMS module 216 may read or otherwise receive data from a PMU 206, geographical network topology data, and the like. The readings may include power flow measurements associated with measurement devices (e.g., PMUs, current sensors, voltage sensors, etc.) connected to an electrical power system (e.g., electric power system, electrical energy system, electric energy system, power grid system, etc.) In some embodiments, the monitoring data can comprise alarm data indicative of an electrical disturbance within the electrical power system, and topology data indicative of a topology of the electrical power system. The EDM module 216 can be operable to correlate the alarm data, which can relate to, for example, an angle disturbance alarm, or, for example, a frequency disturbance alarm, with a change in the topology data.

In this example, the EDM module 216 can determine a characterization (e.g., classification, causation) of the electrical disturbance in the power grid system based on the correlating of the alarm data with the topology data, determining a coherency level representative of the degree of correlation between the alarm data and the topology data, determining a Disturbance Impact Factor (DIF) indicative of an impact of the electrical disturbance on a location in the power grid system, and identify one or more sensors (PMUs) that have captured data of the disturbance. The EDM module 216 can further auto-map PMUs to one or more power system nodes on the grid, retrieve power model information of the power system nodes, and validate the retrieved power model based on the PMU information of the disturbance. In some embodiments, the EMD module 216 can also store and display disturbance history, event history, and a variety of other statistical information related to disturbances and events, including on a graphical user interface, or in a generated report.

Measurement device 220 can obtain, monitor or facilitate the determination of electrical characteristics associated with the power grid system (e.g., the electrical power system), which can comprise, for example, power flows, voltage, current, harmonic distortion, frequency, real and reactive power, power factor, fault current, and phase angles. Measurement device 220 can also be associated with a protection relay, a Global Positioning System (GPS), a Phasor Data Concentrator (PDC), communication capabilities, or other functionalities.

Measurement devices 220 can provide real-time measurements of electrical characteristics or electrical parameters associated with the power grid system (e.g., the electrical power system). The measurement device 220 can, for example, repeatedly obtain measurements from the power grid system (e.g., the electrical power system) that can be used by the EDM module 216. The data generated or obtained by the measurement device 220 can be coded data (e.g., encoded data) associated with the power grid system that can input (or be fed into) a traditional SCADA/EMS system. The measurement device 220 can also be a PMU 206 that repeatedly obtains subs-second measurements (e.g., 30 times per second). Here, the PMU data can be fed into, or input into, applications (e.g., Wide Area Monitoring System (WAMS) and WAMS-related applications) that can utilize the more dynamic PMU data (explained further below).

In the example of FIG. 2, the measurement device 220 includes a voltage sensor 202 and a current sensor 204 that feed data typically via other components, to, for example, the SCADA module 210. Voltage and current magnitudes can be measured and reported to a system operator every few seconds by the SCADA module 210. The SCADA module 210 can provide functions such as data acquisition, control of power plants, and alarm display. The SCADA module 210 can also allow operators at a central control center (e.g., which includes ADMS applications, etc.) to perform or facilitate management of energy flow in the power grid system. For example, operators can use a SCADA module 210 (for example using a computer such as a laptop or desktop) to facilitate performance of certain tasks such as opening or closing of circuit breakers, or other switching operations that might divert the flow of electricity.

In some examples, the SCADA module 210 can receive measurement data from Remote Terminal Units (RTUs) connected to sensors in the power grid system, Programmable Logic Controllers (PLCs) connected to sensors in the power grid system, or a communication system (e.g., a telemetry system) associated with the power grid system. PLCs and RTUs can be installed at power plants, substations, and the intersections of transmission and distribution lines, and can be connected to various sensors, including the voltage sensor 202 and the current sensor 204. The PLCs and RTUs receive its data from the voltage and current sensors to which they are connected. The PLCs and RTUs can convert the measured information to digital form for transmission of the data to the SCADA component. In example embodiments, the SCADA component 210 can also comprise central host server or servers called master terminal units (MTUs), sometimes also referred to as a SCADA center. The MTU can also send signals to PLCs and RTUs to control equipment through actuators and switchboxes. In addition, the MTU can perform controlling, alarming, and networking with other nodes, etc. Thus, the SCADA module 210 can monitor the PLCs and RTUs, and can send information or alarms back to operators over telecommunications channels.

The SCADA module 210 can also be associated with a system for monitoring or controlling devices in the power grid system, such as an Energy Management System (EMS). An EMS can comprise one or more systems of computer-aided tools used by operators of the electric power grid systems to monitor, control, and optimize the performance of the generation or transmission system. Often, an EMS is also referred to as SCADA/EMS or EMS/SCADA. In these respects, the SCADA/EMS or EMS/SCADA can also perform the functions of a SCADA. As another example, a SCADA can be operable to send data (e.g., SCADA data) to the EMS, which can in turn provide the data to the EDM module 216. Other systems with which the EDM module 216 can be associated can comprise a situational awareness system for the power grid system, a visualization system for the power grid system, a monitoring system for the power grid system or a stability assessment system for the power grid system.

As an example, the SCADA module 210 may monitor power flow through lines, transformers, and other components which relies on the taking of measurements periodically (e.g., every two to six seconds, etc.). Additionally, although SCADA module 210 enables some coordination of transmission among utilities, the process can be slow, especially during emergencies, with much of the response based on telephone calls between human operators at the utility control centers. Furthermore, most PLCs and RTUs were developed before industry-wide standards for interoperability were established, and as such, neighboring utilities often use incompatible control protocols.

The measurement device 220 also includes one or more PMUs 206. A PMU 206 can be a standalone device or may be integrated into another piece of equipment such as a protective relay. PMUs 206 can be employed at substations and can provide input into one or more software tools (e.g., WAMS, SCADA, EMS, and other applications). A PMU 206 can use voltage and current sensors that can measure voltages and currents at principal intersecting locations (e.g., substations) on a power grid using a common time source for synchronization, and can output accurately time-stamped voltage and current phasors. The resulting measurement is often referred to as a synchrophasor (although the term synchrophasor refers to the synchronized phasor measurements taken by the PMU 206, some have also used the term to describe the device itself). Because these phasors are truly synchronized, synchronized comparison of two quantities is possible in real time, and this time synchronization allows synchronized real-time measurements of multiple remote measurement points on the grid.

In addition to synchronously measuring voltages and currents, the measurement device 220 may measure phase voltages and currents, frequency, frequency rate-of-change, circuit breaker status, switch status, etc. These measurements can be used to assess system conditions-such as: frequency changes, power in megawatts (MW), reactive power in mega volt ampere reactive (MVARs), voltage in kilovolts (KV), etc. As such, PMU measurements can provide improved visibility into dynamic grid conditions and can allow for real-time wide area monitoring of power system dynamics. Further, synchrophasors account for the actual frequency of the power delivery system at the time of measurement. These measurements are important in alternating current (AC) power systems, as power flows from a higher to a lower voltage phase angle, and the difference between the two relates to power flow. Large phase angle differences between two distant PMUs can indicate the relative stress across the grid, even if the PMUs are not directly connected to each other by a single transmission line. This phase angle difference can be used to identify power grid instability, and a PMU can be used to generate an angle disturbance alarm (e.g., angle difference alarm) when it detects a phase angle difference.

In the example of FIG. 2, one or more Phasor Data Concentrators (PDCs) 212 are shown, which can comprise local PDCs at a substation. Here, PDCs 212 can be used to receive and time-synchronized PMU data from multiple PMUs 206 to produce a real-time, time-aligned output data stream. A PDC can exchange phasor data with PDCs at other locations. Multiple PDCs can also feed phasor data to a central PDC, which can be located at a control center. Through the use of multiple PDCs, multiple layers of concentration can be implemented within an individual synchrophasor data system. The PMU data collected by the PDC 212 can feed into other systems, for example, a central PDC, corporate PDC, regional PDC, the SCADA module 210 (optionally indicated by a dashed connector), energy management system (EMS), synchrophasor applications software systems, a WAMS, the EDM module 216, or some other control center software system. With the very high sampling rates (typically 10 to 60 times a seconds) and the large number of PMU installations at the substations that are streaming data in real time, most phasor acquisition systems comprising PDCs are handling large amounts of data. As a reference, the central PDC at Tennessee Valley Authority (TVA), is currently responsible for concentrating the data from over 90 PMUs and handles over 31 gigabytes (GBs) of data per day.

In this example, the measurement device 220, the SCADA module 210, and PDCs/Central PDCs 212, can provide data (e.g., real-time data associated with devices, meters, sensors or other equipment in the power grid system) (including SCADA data and topology data), that can be used by the EDM module 216 for enhanced disturbance management. Furthermore, the data stored in the repository 214 can be associated SCADA data and PMU data. The data can be indicative of measurements by measurement device 220 that are repeatedly obtained from a power grid system. In example embodiments, the data in repository 214 can comprise PMU/SCADA-based equipment data, such as, for example, data associated with a particular unit, line, transformer, or load within a power grid system (e.g., power grid system 200). The data can comprise voltage measurements, current measurements, frequency measurements, phasor data (e.g., voltage and current phasors), etc. The data can be location-tagged. For example, it can comprise a station identification of a particular station in which a power delivery device being measured is located (e.g., "CANADA8"). The data can comprise a particular node number designated for a location. The data can comprise the identity of the measure equipment (e.g., the identification number of a circuit breaker associated with an equipment). The data can also be time-tagged, indicating the time at which the data was measured by a measurement device. The PMU/SCADA-based equipment data can also contain, for example, information regarding a particular measurement device (e.g., a PMU ID identifying the PMU from which measurements were taken).

In example embodiments, the repository 214 can contain geographical topology data (e.g., PMU/SCADA-based topology data) indicative of a topology for the power grid system 200. The topology of a power grid system can relate to the interconnections among power system components, such as generators, transformers, busbars, transmission lines, substations, switches, loads, consumers, and the like. This topology can be obtained by determining the status of the switching components responsible for maintaining the connectivity status within the network. The switching components can be circuit breakers that are used to connect (or disconnect) any power system component (e.g., unit, line, transformer, etc.) to or from the rest of the power system network. Typical ways of determining topology can be by monitoring of the circuit breaker status, which can be done using measurement devices and components associated with those devices (e.g., RTUs, SCADA, PMUs). It can be determined as to which equipment has gone out of service, and actually, which circuit breaker has been opened or closed because of that equipment going out of service.

The topology data can be indicative of an arrangement (e.g., structural topology, such as radial, tree, etc.) or a power status of devices in the power grid system. Connectivity information or switching operation information originating from one or more measurement devices 220 can be used to generate the topology data. The topology data can be based on a location of devices in the power grid system, a connection status of devices in the power grid system or a connectivity state of devices in the power grid system (e.g., devices that receive or process power distributed in throughout the power grid system, such as transformers and breakers). For example, the topology data can indicate where devices are located, and which devices in the power grid system are connected to other devices in the power grid system (e.g., where devices in the power grid system are connected, etc.) or which devices in the power grid system are associated with a powered grid connection. The topology data can further comprise the connection status of devices (e.g., a transformer, etc.) that facilitate power delivery in the power grid system, and the statuses for switching operations associated with devices in the power grid system (e.g., an operation to interrupt, energize or de-energize or connect or disconnect) a portion of the power grid system by connecting or disconnecting one or more devices in the power grid system (e.g., open or close one or more switches associated with a device in the power grid system, connect or disconnect one or more transmission lines associated with a device in the power grid system etc.). Furthermore, the topology data can provide connectivity states of the devices in the power grid system (e.g., based on connection points, based on busses, etc.).

In example embodiments, the repository 214 can contain a variety of event and event analysis data, which can be derived based on PMU data, and in some embodiments, other data as well (e.g., SCADA data, other measurement data, etc.). The data can comprise information regarding events related to the power grid system 200. An event can comprise, for example, one or more disturbances to the power grid system. A disturbance can comprise, for example, a line disturbance (e.g., line in, or line out), a unit disturbance (e.g., unit in or unit out), or load disturbance (load in or load out). For each event, relevant information such as the station where the event occurred, the voltage level associated with the station (e.g., 500 kV), the node number related to the event, the equipment related to the event, the change in real and reactive power, and change in voltage per unit for the event. The event and event analysis data can also comprise EDM data, which can be data related to events. The various data stored in the repository 214, including equipment data, topology data, event data, event analysis data, EDM data, and other data, can be inputs into the various functionalities and operations that can be performed by the EDM module 216.

FIG. 3A illustrates a user interface 300A for use in power switching operations which includes a geographical view of power devices. Referring to FIG. 3A, the geographical view or "street view" includes a model of a geographical area of space along with locations of power switches 322 and power lines 320 disposed in the geographical area. The user interface 300A also includes geographical markers such as street locations 310. The street view may include other information such as home/consumer locations, meshed networks for high volume electrical networks, and the like. The geographical view provides a geographical model of the locations of the power devices with respect to each other.

Figure 3B:
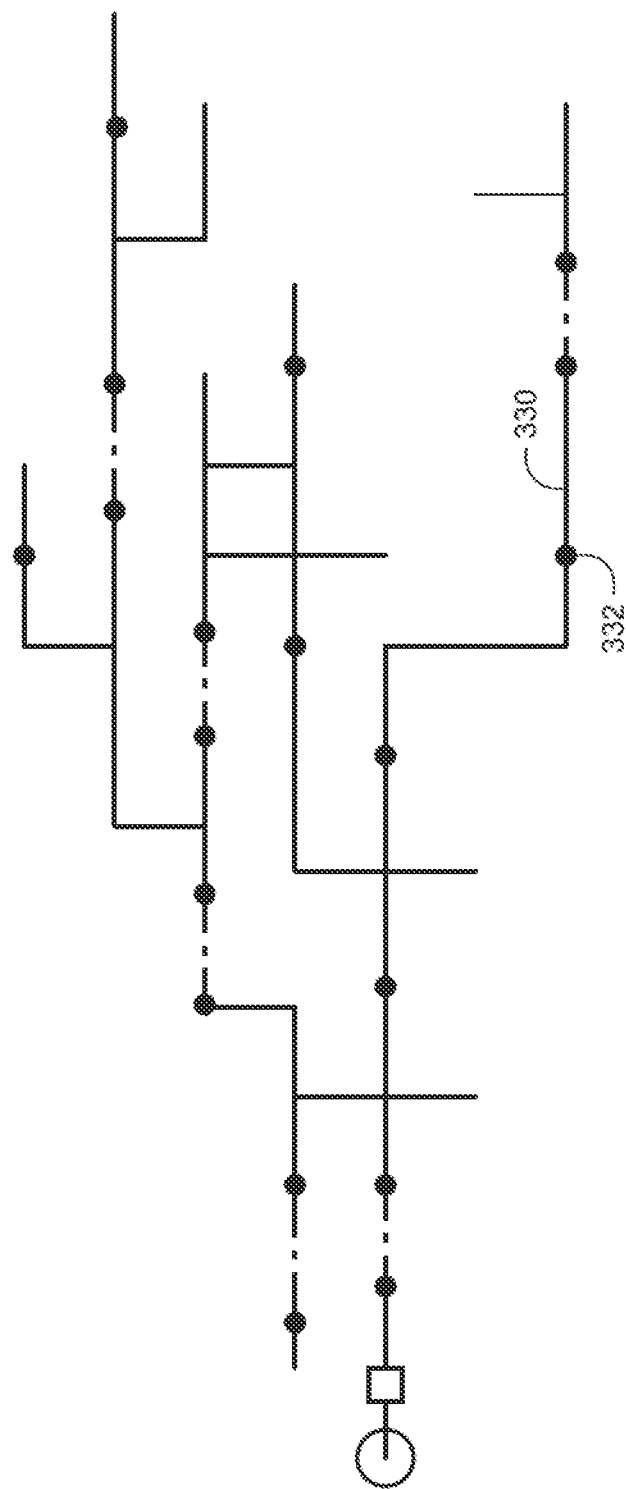
FIG. 3B is a diagram illustrating a user interface for use in power switching operations which includes an orthogonal schematic view of power devices.

FIG. 3B illustrates a user interface 300B for use in power switching operations which includes an orthogonal schematic view of power devices. In this example, the geolocation of the devices is not used, but rather the connections between power switches 332 are used to position the power switches 332 on the diagram. Meanwhile, the power switches 332 are connected by lines 330 that represent the flow of power.

However, the underlying issue that makes both geographical view in the user interface 300A and the orthogonal view in the user interface 300B is the need to have network-level awareness when performing switching operations. When too many devices and their inter-connecting links are rendered on the user interface, a hairball effect happens reducing the readability of the network. In addition, switching operations are complex operations which require operators to consider micro and macro-level operational parameters for every switching action. If the operator has a hard time differentiating between two switches on the screen which are very close to or on top of each other, the operator could easily make a mistake. Furthermore, if the operator zooms in to have a closer view of the switch, the operator loses information about nearby/surrounding switching devices.

To address the drawbacks of the geographical view and the horizontal schematic view, provided is an arc schematic view or arc diagram that represents the devices and the interconnections of the electrical network. The arc schematic view includes a graphical rendering in which nodes representing devices (e.g., switches in the electrical network, etc.) are arranged and remain on a straight horizontal line/axis while the edges (lines) that interconnect the nodes are drawn as arcs between the nodes.

Figure 5B:
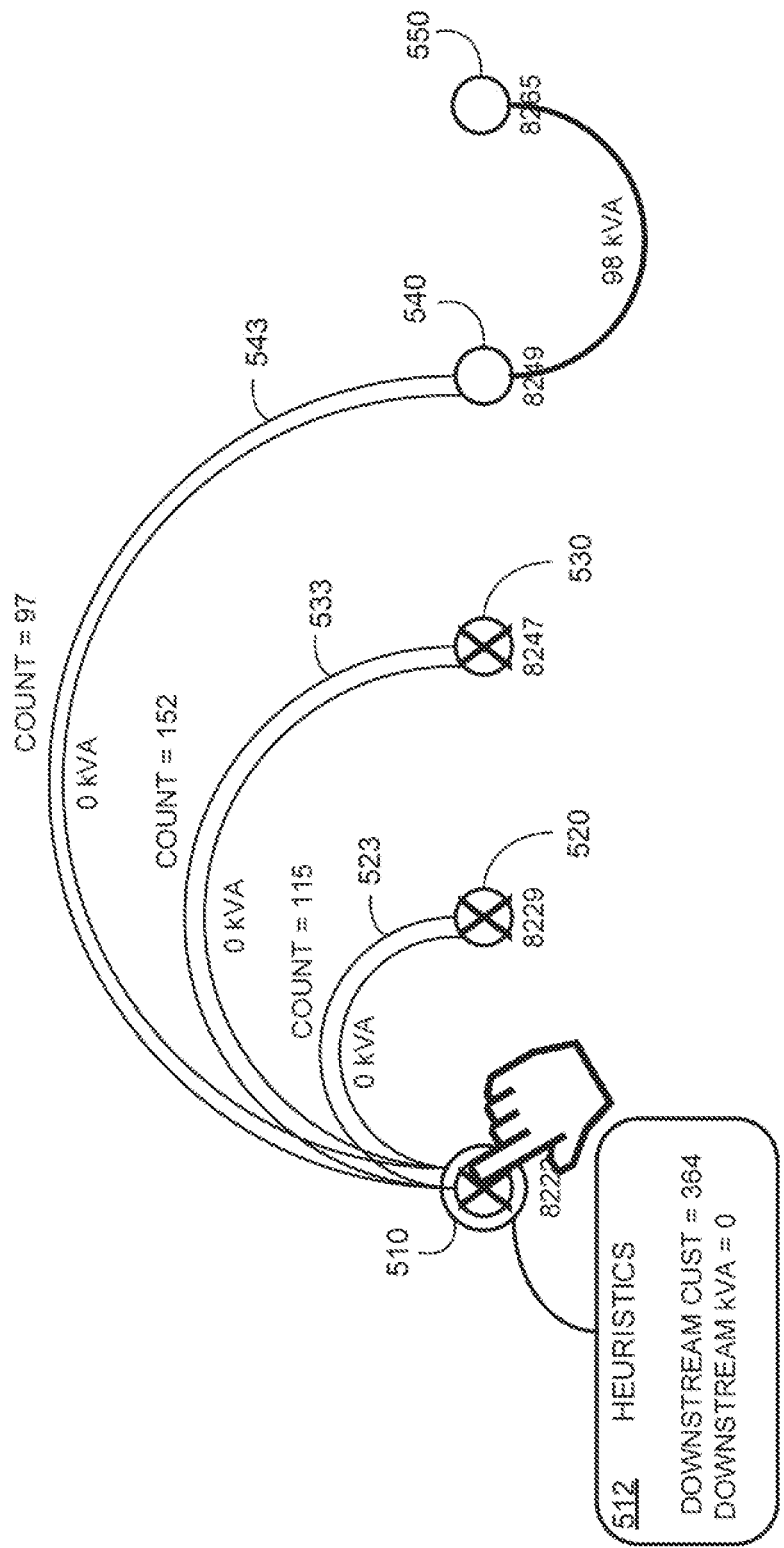

In these examples, the arcs on top of the horizontal axis (i.e., that move upward from the horizontal line) denote power flows in a forward direction from left to right. Meanwhile, the arcs on the bottom of the horizontal axis (i.e., that move downward from the horizontal line) denote power flows in a reverse direction (right to left). For two nodes that are connected by both an upper arc and a lower arc, these nodes are considered loops. The advantage of an arc schematic is that it can show clusters (densely connected devices) easily without cluttering up the display. Furthermore, as shown in the examples of FIGS. 5A and 5B, as the user traverses across the nodes within the user interface, context specific information can be shown to facilitate switching decisions.

Figure 4B:
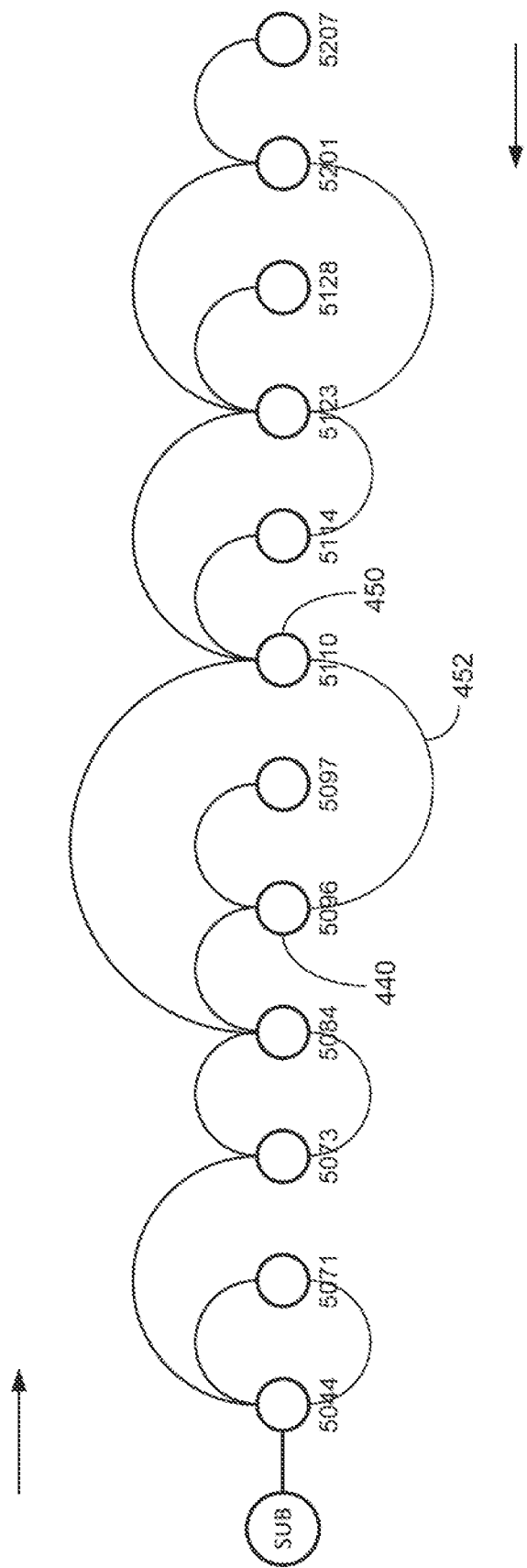

FIGS. 4A and 4B are diagrams illustrating user interfaces 400A and 400B, respectively, which include an arc schematic view of power devices and their inter-connections in an electrical network in accordance with example embodiments. Referring to FIG. 4A, a plurality of nodes (e.g., nodes 410, 420, etc.) are arranged on a horizontal axis with respect to each other. Each node is positioned an equal distance apart from its neighboring nodes on both sides and includes a label 412 which uniquely identifies the device by name, ID, etc. The distance between the nodes can be enough to allow for an operator to have a clear view at all times.

Furthermore, nodes are connected to each other through arcs (e.g., arc 414, etc.). The arcs in this example are all on the top of the arc schematic and represent power that flows from left to right (forward). For example, an arc 414 between the nodes 410 and 420 represents power that flows from a switch device (i.e., ID 5044) to another switch device (i.e., ID 5073). Each arc represents a single power flow. In some cases, a node has multiple arcs being output which indicates multiple flows of power from that power device to other power devices on the electrical network.

To further help the operator understand what they are viewing, the user interface 400A may include a mini geographical view 430 with a highlighted area 432 indicating the corresponding nodes and lines shown in the arc-schematic above. The nodes on the arc-schematic diagram are self-ordering and will display the related devices closest to the device in question. This eliminates clutters and cross-overs (unrelated or electrically far away devices are not shown on the diagram where the switching is happening) and the operator will see only the devices and paths that could be impacted by a switching operation.

FIG. 4B illustrates an additional set of arcs that have been added to the bottom of the diagram. In this example, the arcs on the bottom of the horizontal axis represent power that flows in reverse with respect to the arcs above the horizontal axis. For example, an arc 452 between nodes 450 and 440, represents a power flow from a switch device (i.e., ID 5110) to a switch device (i.e., 5096). When two nodes are connected by both upper arcs and lower arcs (e.g., nodes of switch devices 5044 and 5071), it represents a loop of power that flows between the two switch devices.

FIGS. 5A and 5B illustrate user interfaces 500A and 500B, respectively, which include heuristics displayed within an arc schematic view of power devices in accordance with an example embodiment. Referring to FIG. 5A, the user interface 500A includes a zoomed-in section of a larger arc-schematic (not shown). In this example, five nodes corresponding to five switches are shown. As the user moves a cursor 501 within a predefined distance of a node, additional heuristics may be displayed about the current power conditions at that node as well as the other nodes which have interconnecting power flows with the node. In other words, the heuristics may initially be hidden. When the user moves the cursor 501 such that it is closer to a particular node with respect to the other nodes in the arc schematic, such that it is hovering over a particular node, or the like, and the user interface 500A may output the heuristics of the node. The heuristics eliminates the need for network level view as the micro level heuristics are derivatives of the macro level conditions. Since, the micro level heuristics are enough to perform switching in a localized area, the arc-schematic diagram will always be simple from an operational point of view and eliminate guesswork from the operator' point-of-view.

For example, as a user moves the cursor 501 within a predefined distance 514 (e.g., a predetermined number of pixels on the screen, etc.) from a node 510, heuristics associated with the node 510 may be output on the user interface 500A. For example, a first set of heuristics 512 may include a total voltage count value and a total customer count value that receive power from the switch 8222 corresponding to node 510. Additional heuristics can include a voltage count value 522 that represents an amount of voltage that would be lost between two switches, the node 510 (switch 8222) and the node 520 (switch 8229), should the operator turn off the switch 8222 corresponding to the node 510. In addition, a customer count value 524 represents the amount of customers that would be without power between the node 510 (switch 8222) and the node 520 (switch 8229) if the operator turns off the switch 8222 corresponding to the node 510. Similar values for voltage count and customer can be displayed on each arc that flows out of node 510 and into node 520. In this example, an additional arc 552 is displayed illustrating a reverse power flow that could kick in to supply power to switch 8249 corresponding to node 540.

In the example of FIG. 5B, a user has taken the cursor 501 and positioned so that it hovers over node 510. The user has also input a command (e.g., a mouse click, touch on the screen, keyboard command, etc.) while the cursor is positioned on the node 510 which causes the switch device 8222 represented by the node 510 to be switched from an ON state to an OFF state. As a result, switching devices corresponding to nodes 520 and 530 also lose power. Furthermore, the arcs 523, 533, and 543, representing power lines between node 510 and nodes 520, 530, and 540, respectively, have lost power as well. Meanwhile, the backup power from switch 8265 to switch 8249 has kicked in and is being supplied to supplement the lost power at switch 8249 corresponding to node 540.

Figure 6:
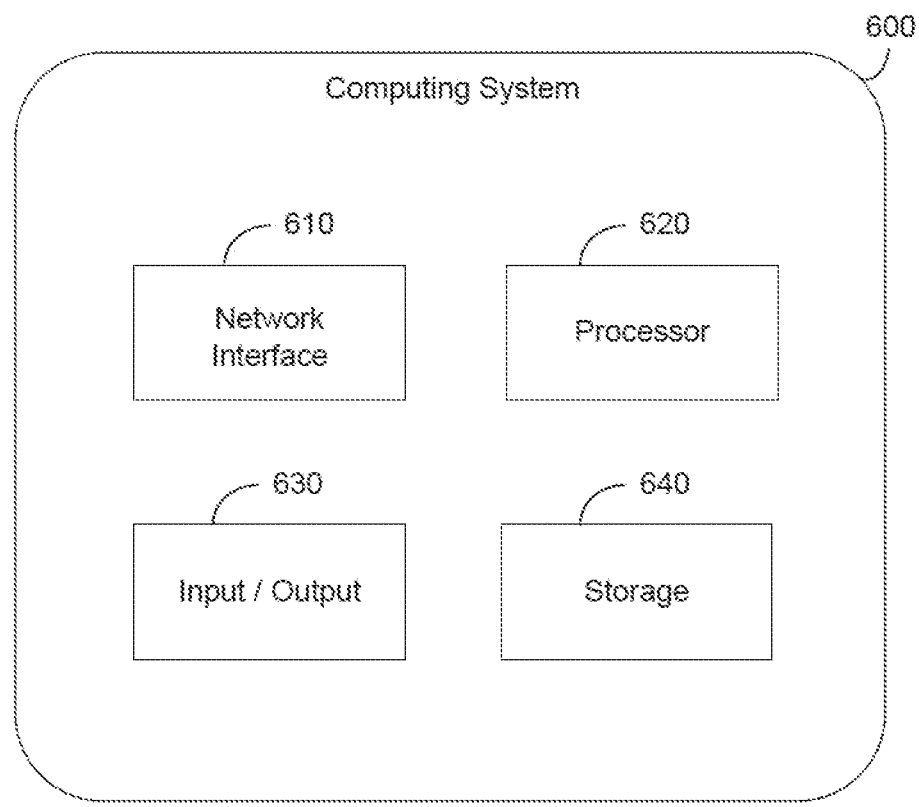
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the methods shown herein. According to various embodiments, the storage 640 may include a data store having a plurality of tables, records, partitions and sub-partitions. The storage 640 may be used to store database records, documents, entries, and the like.

Figure 7:
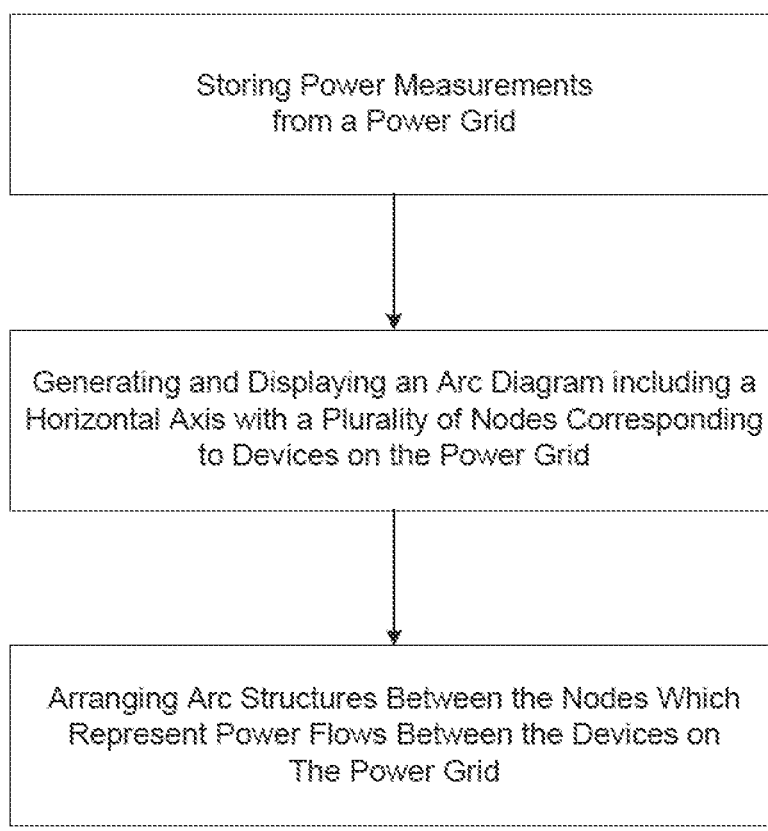
FIG. 7 is a diagram illustrating a method of generating an arc diagram for a switching operation in accordance with an example embodiment.

FIG. 7 illustrates a method of generating an arc diagram for a switching operation in accordance with an example embodiment. For example, the method may be performed by a computing system such as shown in FIG. 6. The computing system may be a database, a server, a user device, a cloud platform, or the like. Referring to FIG. 7, in 710, the method may include storing power measurements from a power grid and geographical topology data of devices on the power grid via a memory device. For example, the power measurements may be measured by sensors on the grid and sent to a central operation such as a control center, a server, a cloud platform, or the like. The power measurements may be transmitted by/received from one or more of a phasor measurement unit (PMU) and a Supervisory Control and Data Acquisition (SCADA) system, although embodiments are not limited thereto.

In 720, the method may include generating and displaying an arc diagram based on the geographical topology data, where the arc diagram comprises a plurality of nodes corresponding to a plurality of devices on the power grid which are arranged along a horizontal axis in the arc diagram. Furthermore, in 730, the method may include arranging arc-shaped structures between the plurality of nodes on the horizontal axis based on the power measurements, where the arc-shaped structures represent power flows between the plurality of devices.

In some embodiments, the method may further include receiving current power conditions measured from the power grid and the arranging further comprises displaying one or more of current voltage conditions and current customer data on the arc-shaped structures. In some embodiments, the arranging may include arranging each of the plurality of nodes along a single horizontal line in the arc diagram. In some embodiments, the arranging may include arranging the plurality of nodes along the single horizontal line such that each node is equidistant from any respective immediately neighboring nodes on the single horizontal line.

In some embodiments, the geographical topology data of devices on the power grid comprises geographical locations of power system devices and interconnections among the power system devices, and the power system devices include one or more of generators, transformers, busbars, transmission lines, substations, switches, loads, and consumers locations. In some embodiments, the displaying may include displaying the arc diagram in response to a request to perform a switching operation via the user interface.

In some embodiments, the method may further include identifying a subset of devices on the power grid that are going to be impacted by the switching operation and displaying a subset of nodes in sequence on the horizontal axis corresponding to the identified subset of devices that are going to be impacted. In some embodiments, the displaying may include displaying the arc diagram within a user interface of a page of an advanced distribution management system (ADMS) application.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system for providing a power grid arc diagram comprising:

a memory configured to store power measurements from a power grid and geographical topology data of devices on the power grid; and a processor configured to:

generate an arc diagram based on the geographical topology data;

display the arc diagram which comprises a plurality of nodes corresponding to a plurality of devices on the power grid, wherein the plurality of nodes are arranged along a single horizontal line; and arrange at least one arc-shaped structure between each node of the plurality of nodes based on the power measurements, where arc-shaped structures connecting nodes above the horizontal line represents power flowing in a forward direction and where arc-shaped structure connecting nodes below the horizontal line represents power flowing in a reverse direction enabling an operator to visualize current conditions of an electrical network and to at least one of input commands and perform operations for switching power on and off, and the like, to at least one of the plurality of the devices on the electrical network of the power grid.

2. The computing system of claim 1, wherein the processor is configured to receive current power conditions measured from the power grid and display one or more of current voltage conditions and current customer data in association with the arc-shaped structures in the arc diagram.

3. The computing system of claim 1, wherein the processor is configured to arrange the plurality of nodes along the single horizontal line such that each node is equidistant from any respective immediately neighboring nodes.

4. The computing system of claim 1, wherein the processor is configured to receive the power measurements from one or more of a phasor measurement unit (PMU) and a Supervisory Control and Data Acquisition (SCADA) system.

5. The computing system of claim 1, wherein the geographical topology data of devices on the power grid comprises geographical locations of power system devices and interconnections among the power system devices, and the power system devices include one or more of generators, transformers, busbars, transmission lines, substations, switches, loads, and consumers locations.

6. The computing system of claim 1, wherein the processor is configured to display the arc diagram in response to a request to perform a switching operation via the user interface.

7. The computing system of claim 6, wherein the processor is further configured to identify a subset of devices on the power grid that are going to be impacted by the switching operation and display a subset of nodes in sequence on the horizontal line corresponding to the identified subset of devices that are going to be impacted.

8. The computing system of claim 1, wherein the processor is configured to display the arc diagram within a user interface of a page of an advanced distribution management system (ADMS) application.

9. A method for providing a power grid arc diagram comprising:

storing power measurements from a power grid and geographical topology data of devices on the power grid via a memory device;

generating an arc diagram based on the geographical topology data;

displaying the arc diagram which comprises a plurality of nodes corresponding to a plurality of devices on the power grid, wherein the plurality of nodes are arranged along a single horizontal line; and arranging at least one arc-shaped structure between each node of the plurality of nodes based on the power measurements, where arc-shaped structures connecting nodes above the horizontal line represents power flowing in a forward direction and where arc-shaped structure connecting nodes below the horizontal line represents power flowing in a reverse direction enabling an operator to visualize current conditions of an electrical network and to at least one of input commands and perform operations for switching power on and off, and the like, to at least one of the plurality of the devices on the electrical network of the power grid.

10. The method of claim 9, wherein the method further comprises receiving current power conditions measured from the power grid and the arranging further comprises displaying one or more of current voltage conditions and current customer data on the arc-shaped structures.

11. The method of claim 9, wherein the arranging comprises arranging the plurality of nodes along the single horizontal line such that each node is equidistant from any respective immediately neighboring nodes on the single horizontal line.

12. The method of claim 9, wherein the method further comprises receiving the power measurements from one or more of a phasor measurement unit (PMU) and a Supervisory Control and Data Acquisition (SCADA) system.

13. The method of claim 9, wherein the geographical topology data of devices on the power grid comprises geographical locations of power system devices and interconnections among the power system devices, and the power system devices include one or more of generators, transformers, busbars, transmission lines, substations, switches, loads, and consumers locations.

14. The method of claim 9, wherein the displaying comprises displaying the arc diagram in response to a request to perform a switching operation via the user interface.

15. The method of claim 14, wherein the method further comprises identifying a subset of devices on the power grid that are going to be impacted by the switching operation and displaying a subset of nodes in sequence on the horizontal line corresponding to the identified subset of devices that are going to be impacted.

16. The method of claim 9, wherein the displaying comprises displaying the arc diagram within a user interface of a page of an advanced distribution management system (ADMS) application.

17. A non-transitory computer-readable medium comprising instructions which when executed by a processor cause a computer to perform a method for providing a power grid arc diagram comprising:

storing power measurements from a power grid and geographical topology data of devices on the power grid via a memory device;

generating an arc diagram based on the geographical topology data;

displaying the arc diagram which comprises a plurality of nodes corresponding to a plurality of devices on the power grid, wherein the plurality of nodes are arranged along a single horizontal line; and arranging at least one arc-shaped structure between each node of the plurality of nodes based on the power measurements, where arc-shaped structures connecting nodes above the horizontal line represents power flowing in a forward direction and where arc-shaped structure connecting nodes below the horizontal line represents power flowing in a reverse direction enabling an operator to visualize current conditions of an electrical network and to at least one of input commands and perform operations for switching power on and off, and the like, to at least one of the plurality of the devices on the electrical network of the power grid.

18. The non-transitory computer-readable medium of claim 17, wherein the method further comprises receiving current power conditions measured from the electrical networks and displaying one or more of voltage conditions and customer data on the arc structures between the nodes in the arc diagram.

\* \* \* \* \*